United States Patent [19]

Bennett, Jr.

[11] 3,909,722

[45] Sept. 30, 1975

[54] VARIABLE FREQUENCY COMMUNICATION SYSTEM

[75] Inventor: Victor A. Bennett, Jr., Gloucester, Mass.

[73] Assignee: JBH Electronic Systems, Inc., Burlington, Mass.

[22] Filed: June 22, 1973

[21] Appl. No.: 372,641

[52] U.S. Cl. .................... 325/45; 325/64; 325/131; 325/349; 325/364; 340/207 R; 340/224

[51] Int. Cl.² ............................................ H04B 7/00

[58] Field of Search ............ 325/22, 43, 45, 55, 35, 325/64, 105, 117, 111, 131, 152, 349, 364, 455, 132, 145; 340/224, 171 R, 177 R, 207 R, 208

[56] References Cited

UNITED STATES PATENTS

| | | | |
|---|---|---|---|
| 2,422,664 | 6/1947 | Feldman | 325/131 |
| 2,448,055 | 8/1948 | Silver et al. | 325/35 |
| 2,994,765 | 8/1961 | Adam | 325/117 |
| 3,407,354 | 10/1968 | Wheeler | 325/131 |
| 3,530,472 | 9/1970 | Fukata et al. | 325/131 |
| 3,584,303 | 6/1971 | Guanella | 325/131 |
| 3,660,811 | 5/1972 | Vail et al. | 325/132 |
| 3,696,359 | 10/1972 | Ross et al. | 325/105 |

*Primary Examiner*—Robert L. Griffin
*Assistant Examiner*—Jin F. Ng
*Attorney, Agent, or Firm*—Charles Hieken; Jerry Cohen

[57] ABSTRACT

An alarm condition for a predetermined time interval turns a transmitter on that radiates a frequency modulated signal over a substantial portion of the FM band at a predetermined modulating rate that is preferably slightly superaudio outside the usual usable frequencies in the frequency modulating band. A frequency modulation receiver is tuned to a clear channel in the frequency range over which the transmitter frequency is deviated to provide a demodulated signal of frequency at the predetermined sweep rate that is passed by a tone filter to signify the alarm condition. The transmitter may include a low battery indicator signal source that produces a deviation rate different from that produced upon the occurrence of an alarm condition so that a low battery condition may be detected by the receiver.

9 Claims, 1 Drawing Figure

VARIABLE FREQUENCY COMMUNICATION SYSTEM

BACKGROUND OF THE INVENTION

The present invention relates in general to variable frequency communication and more particularly concerns novel apparatus and techniques for sensing alarm conditions with compact relatively inexpensive sensors of alarm conditions and utilizing a conventional FM receiver comprising remote means for detecting alarm conditions while allowing the receiver to function as a broadcast receiver when alarm detection is not desired. The invention is reliable and may readily be installed without wiring.

It is an important object of the invention to provide an economical, reliable wireless alarm system.

It is another object of the invention to achieve the preceding object with compact sensors.

It is a further object of the invention to achieve one or more of the preceding objects with apparatus that consumes relatively little power and provides an indication when the battery is low.

It is a further object of the invention to achieve one or more of the preceding objects in a system that may use a conventional type FM receiver.

It is still a further object of the invention to achieve one or more of the preceding objects with transmitters that do not require precise tuning and a receiver that need not be critically tuned, regardless of the location of the system.

It is a further object of the invention to achieve one or more of the preceding objects with apparatus that is relatively economical and easy to install by relatively unskilled personnel.

SUMMARY OF THE INVENTION

According to the invention, there is transmitting means for radiating a frequency modulated signal in response to the occurrence of an alarm signal. There is a source of an alarm signal upon occurrence of an alarm condition for turning the transmitting means on, the transmitting means including means for deviating the frequency of the transmitter over a frequency range a number of times greater than the width of a single frequency modulation channel in the broadcast frequency modulation band. There is conventional frequency modulation receiving means tuned to a frequency different from those of frequency modulation stations receivable in the area of the alarm system and means for detecting the deviation rate of the transmitting means when an alarm condition occurs.

Numerous other features, objects, and advantages of the invention will become apparent from the following specification when read in connection with the accompanying drawing in which:

DETAILED DESCRIPTION OF PREFERRED EMBODIMENTS

Figures 1, 2, 3:
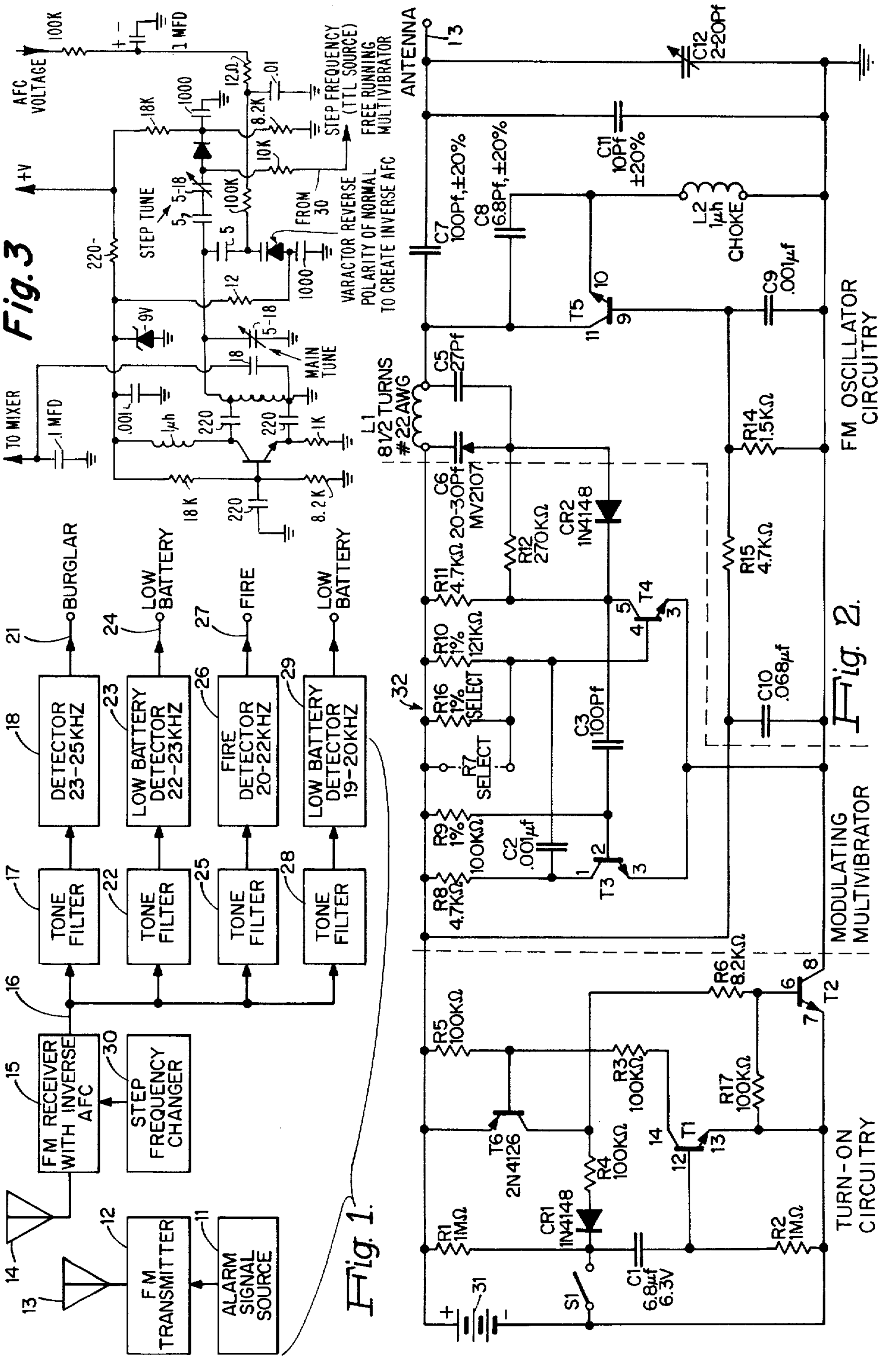
FIG. 1 is a block diagram illlustrating the logical arrangement of a system according to the invention.
FIG. 2 is a schematic circuit diagram illustrating and exemplary embodiment of a transmitter according to the invention.
FIG. 3 is a schematic circuit diagram of a receiver local oscillator having inverse AFC and stepped frequency change.

With reference now to the drawing and more particularly FIG. 1 thereof, there is shown a block diagram illustrating the logical arrangement of a system according to the invention. An alarm signal source 11 turns on wide deviation FM transmitter 12 to radiate a widely deviating FM signal from transmitting antenna 13 upon sensing an alarm condition. Receiving antenna 14 receives this signal to provide a corresponding signal that is demodulated by FM receiver 15 to provide a tone on output line 16 corresponding to the deviation rate that is selectively passed by a tone filter, such as tone filter 17, to detector 18 to provide, for example, a burglar alarm indication on line 21. Burglar alarm detector 18 typically detects a tone between 23 and 25 kHz. Tone filter 22 typically selectively passes a tone between 22 and 23 kHz to provide a low battery alarm signal indicative of the transmitter battery being low on output 24 of low battery detector 23. Tone filter 25 typically selectively transmits a tone signal between 20 and 22 kHz to fire detector 26 to provide on output 27 an indication of a fire alarm condition that may be from FM transmitter 12 or from a different FM transmitter associated with a different alarm signal source. Tone filter 28 typically selectively passes a tone signal between 19 and 20 kHz to provide a low battery alarm signal at the output of low battery detector 29 when the transmitter battery associated with the fire alarm sensor is low. A feature of the invention is that the transmitters are so compact and relatively inexpensive that there may be a separate transmitter associated with each potential alarm signal source. For example, there may be a separate transmitter associated with each door or window subject to being opened by a potential intruder. There could be a separate transmitter associated with a fire detector in each location where it is desired to obtain an indication of a fire.

In a preferred form of the invention the receiver includes step frequency changer 30 for causing the signal frequency received by the receiver to shift between frequencies about 400 kHz apart, about twice the width of a standard broadcast channel. This feature minimizes the occurrence of false alarms because it is unlikely that noise signals on two spaced frequencies would produce a tone component to which the receiving system would respond. The specific means for accomplishing this shift between frequencies may be a free-running multivibrator that delivers a rectangular voltage waveform across a varactor diode in the local oscillator of the receiver for controlling the local oscillator frequency. A suitable switching period is 600 milliseconds.

The receiver preferably has inverse AFC for causing the receiver to drift off any standard broadcast station. However, the receiver does not change frequency in response to transmission from a transmitter according to the invention because the sweeping across such a wide frequency range at a rapid deviation rate produces no frequency controlling effect in the AFC circuitry. Inverse AFC is readily accomplished with conventional circuitry, for example, by reversing the polarity of the varactor diode from the sense used to effect conventional AFC. The AFC control output from a conventional limiter discriminator, such as a CA3089E, may be coupled to the same frequency controlling varactor diode that receives the signal from step frequency changer 30.

The particular means for indicating the alarm condition is not a part of the invention and may be a visible indicator, such as an alarm light, an aural indicator, such as a bell or piezoelectric transducer, or a direct dialing means that notifies the police station or fire station of an alarm condition.

The invention has a number of features. Because the carrier is deviated over an exceptionally wide range of frequencies, the center frequency need not be carefully maintained, and there is certain to be a clear channel where virtually any conventional FM receiver may be tuned in virtually any location and still be able to detect the occurrence of an alarm condition. Yet the power radiated by the transmitter is so low that an FCC license is not required for the transmitter, and the alarm signal is not capable of interfering with the reception of stronger FM broadcast signals. And the size of the transmitter is sufficiently small so that it may be located inside a door or window to be protected by drilling a hole and inserting the transmitter to actuate an alarm switch when the door or window is opened.

Referring to FIG. 2, there is shown a schematic circuit diagram of an exemplary embodiment of a transmitter according to the invention that may be packaged in a small tube ⅝ inches in diameter by 6 inches in length. The transmitter comprises transistors T1–T6 and associated circuit components shown in FIG. 2. Transistors T1–T5 may comprise an RCA CA3086 14-pin-dual inline package. Transistor T5 and associated circuitry to the right of the broken lines comprise the frequency-modulated oscillator. Transistors T3 and T4 and associated circuitry between the broken lines comprise a modulating multivibrator. Transistor T1, T6, T2 and associated components to the left of the broken lines effectively keep the battery 31 disconnected until normally open switch S1 comprising the source of the alarm signal, closes for the order of two seconds so as to avoid producing an alarm condition unless indicated for at least that duration.

Having briefly discussed the circuit arrangement its mode of operation will be described. With switch S1 in the no-alarm position as shown, transistor T1 does not conduct and battery 31 is effectively disconnected from the rest of the circuit. This arrangement is advantageous because battery drain is very slight. When an alarm condition occurs, switch 11 closes, causing the potential on the base of NPN transistor T1 to rise sufficiently after two seconds to render transistor T1 conductive, thereby allowing all the remaining transistors to receive operating potentials. The normally quiescent oscillator circuitry then produces oscillations radiated by transmitting antenna 13 at a frequency within the broadcast FM band deviated over a range typically of 5 MHz at a superaudio modulating frequency corresponding to the free running rate of the normally quiescent modulating multivibrator circuit. Tuning resistor 32 comprises the parallel combination of resistors R10, R16 and R7 as means for establishing this frequency. The output of the multivibrator is a ramp waveform that is applied to the varactor diode C6 in the ocsillator tank circuit to sweep the oscillating frequency.

The oscillator comprises a conventional grounded base oscillator circuit whose frequency is largely controlled by the resonant tank in the collector circuit comprising inductor L1 shunted by the series combination of fixed capacitor C5 and the variable capacitance of varactor diode C6 with capacitor C8 providing a feedback path from the collector to the emitter to sustain oscillations.

As the battery potential drops, the free-running frequency of the modulating multivibrator decreases to then cause low battery detector 23 to provide an indication on output 24 that the battery is low when the alarm condition is indicated. Thus, when the alarm is periodically tested to see that it is operative, such as by opening a door for more than two seconds with the alarm on, the tester observes actuation of the low battery indicator and determines that it is then time to change the battery in the transmitter.

Tuning resistor 32 may be selected at different values to indicate different alarm conditions, being one value for a burglar alarm condition and another value for a fire alarm condition. Alternatively, it could be selected for different values to indicate alarms at different locations. Still alternatively, all the tuning resistors in a given environment could be of substantially the same value where it was desired only to indicate an alarm condition, regardless of the nature or location of the alarm.

FIG. 2 is a schematic circuit diagram of an exemplary embodiment with actual exemplary parameter values indicated. The antenna elements making up antenna 13 form a loop.

The particular form of the FM receiver, tone filters and detectors are not a part of the invention and are well-known to those skilled in the art. those skilled in the art may also modify a conventional FM receiver to have inverse AFC; that is to say, the receiver frequency is controlled to a normally clear channel.

A conventional FM broadcast channel is 200 kHz with the normal deviation ± 75 kHz. The typical 5 Mhz deviation of the transmitter is therefore greater than the channel width of an FM broadcast channel, preferably many times that channel width and at least ten times that channel width. Typical power output is less than 100 mw., the maximum allowable by the FCC without requiring a license. The invention thus represents an economical compact wireless alarm system that is easy to install by relatively unskilled personnel, uses existing broadcast FM equipment with negligible interference with broadcast programs and without requiring maintenance of precise frequency control. The tones are preferably above 15 kHz, away from the 19 kHz pilot carrier, outside the 23–53 kHz subcarrier band and away from the SCA band.

It is evident that those skilled in the art may now make numerous other uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Variable frequency communicating apparatus comprising, means for radiating a low power frequency modulated signal having a power output of 100 milliwatts maximum, means for deviating the frequency of said signal over a bandwidth than spans a plurality of adjacent FM broadcast channels at a rate at least equal to an audio frequency, and receiving means tuned to a center frequency in the FM band that is clear of standard FM broadcast signals detectable by said receiving means for providing tones representing the modulated signal and said receiving means having means for selectively passing said tones within a predetermined bandwidth for selectively detecting the rate at which said deviation occurs.

2. Variable frequency communicating apparatus in accordance with claim 1 wherein the frequency deviation spans at least ten continuous standard FM broadcast channels.

3. Variable frequency communicating apparatus in accordance with claim 1 wherein said receiving means further comprises step frequency changer means for switching said center frequency between first and second frequencies separated by a frequency difference less than said bandwidth at a rate corresponding to an audio frequency.

4. Variable frequency communicating apparatus in accordance with claim 1 wherein said receiving means further comprises, inverse automatic frequency control for tuning said receiving means to a center frequency in the FM broadcast band that is clear of standard FM broadcast signals for receiving the radiated frequency modulated signal and having means for providing a detected signal having a tone frequency corresponding to the rate at which the frequency modulated signal frequency is deviated, and means for selectively transmitting signals of said tone frequency to indicate an alarm condition in response to the occurrence of said detected signal.

5. Variable frequency communicating apparatus in accordance with claim 4 wherein said receiving means further comprises step frequency changer means for switching said center frequency between first and second frequencies separated by a frequency difference less than said bandwidth at a rate corresponding to an audio frequency.

6. Variable frequency communicating apparatus comprising, means for radiating a low power frequency modulated signal having a power output of 100 milliwatts maximum, means for deviating the frequency of said signal over a bandwidth that spans a plurality of adjacent FM broadcast channels at a rate at least equal to an audio frequency wherein said means for deviating comprises a normally quiescent modulating multivibrator coupled to a frequency-modulated oscillator for deviating the frequency of the latter when said modulating multivibrator is nonquiescent, and further comprising switching means responsive to occurrence of an alarm condition for rendering said modulating multivibrator in a free-running condition to deviate the frequency of said frequency modulated oscillator over said bandwidth at the free-running rate of said modulating multivibrator.

7. Variable frequency communicating apparatus comprising, means for radiating a low power frequency modulated signal having a power output of 100 milliwatts maximum wherein said means for radiating comprises, an oscillator having a voltage-controlled capacitance comprising means for controlling the oscillator frequency, and means for deviating the frequency of said signal over a bandwidth that spans a plurality of adjacent FM broadcast channels at a rate at least equal to an audio frequency, said means for deviating comprising a free-running multivibrator including means for providing a ramp voltage waveform to said voltage controlled capacitance of a frequency that is above 15 kHz, away from 19 kHz and outside the 23–53 kHz subcarrier band whereby the ramp voltage waveform varies the voltage-controlled capacitance and thereby deviates said oscillator frequency.

8. Variable frequency communicating apparatus in accordance with claim 7 and further comprising, receiving means with inverse automatic frequency control for tuning said receiving means to a center frequency in the FM broadcast band that is clear of standard FM broadcast signals for receiving the radiated frequency modulated signal and having means for providing a detected signal having a tone frequency corresponding to the rate at which the frequency modulated signal frequency is deviated, and means for selectively transmitting signals of said tone frequency to indicate an alarm condition in response to the occurrence of said detected signal.

9. Variable frequency communicating apparatus in accordance with claim 8 and further comprising, said receiving means having step frequency changer means for switching said center frequency between first and second frequencies separated by a frequency difference less than said bandwidth at a rate corresponding to an audio frequency.

* * * * *